United States Patent [19]
Zey

[11] Patent Number: 6,073,164
[45] Date of Patent: Jun. 6, 2000

[54] METHOD AND ARTICLE OF MANUFACTURE FOR COMMUNICATION TO TELECOMMUNICATIONS SWITCHES, SUCH AS IPX SWITCHES

[75] Inventor: David A. Zey, Fuquay-Varina, N.C.

[73] Assignee: MCI Communications Corporation, Washington, D.C.

[21] Appl. No.: 08/914,537

[22] Filed: Aug. 19, 1997

[51] Int. Cl.[7] .................................................. G06F 13/00
[52] U.S. Cl. .................................... 709/203; 370/218
[58] Field of Search .................................... 709/200, 201, 709/202, 203, 217, 218, 219; 370/218, 244, 299, 375, 389, 422

[56] References Cited

U.S. PATENT DOCUMENTS

4,987,492  1/1991  Stults et al. .............................. 348/15
5,073,890  12/1991 Danielsen ................................. 370/270
5,329,570  7/1994  Glassmacher et al. .................. 379/189
5,606,604  2/1997  Rosenblatt et al. ...................... 379/198
5,825,772  10/1998 Dobbins et al. .......................... 370/396

*Primary Examiner*—Moustafa M. Meky

[57] ABSTRACT

A method, system, and article of manufacture for communicating to or querying telecommunication switches in a telecommunications network first gathers relevant information from a technician. Such information can include user IDs, passwords, switch identification codes, and required commands. The routine then automatically establishes communication links with appropriate servers and identified switches within the network using previously supplied IDs and passwords. Thereafter, commands are presented to such switches and results reported to the technician. Numerous switches may thereby be rapidly accessed and queried by the technician.

32 Claims, 10 Drawing Sheets

METHOD AND ARTICLE OF MANUFACTURE FOR COMMUNICATION TO TELECOMMUNICATIONS SWITCHES, SUCH AS IPX SWITCHES

TECHNICAL FIELD

The present invention relates to telecommunications networks, and in particular, to communicating with switches within such networks.

BACKGROUND OF THE INVENTION

Telecommunications networks include multiple links or trunks interconnected with switches. Such switches are typically high-speed digital switches using known protocols such as internetwork packet exchange (IPX) and the greater bandwidth version IGX. Communication with such IPX/IGX switches is performed via routers over access links using protocols such as the conventional Frame-Relay protocol. Switches manufactured by Stratacom are examples of such high-speed digital switches. Such IPX/IGX switches are connected with other IPX switches in a telecommunications network. One example of such a network of interconnected switches is the Concert Frame Relay Service network operated by MCI, Inc.

When customers experience failures with their permanent virtual connections, technicians must perform troubleshooting for a reported problem. The technician must access the IPX switch associated with a given customer and initiate specific commands in order to determine the condition of the customer's circuit path and circuit status via the IPX switch. There are typically six specific commands that the technician must initiate to extract information from the switch to determine the logical status of the customer's circuit.

One problem technicians experience is that many of the IPX switches support only a single access method. If a technician remains logged into a given IPX switch, he or she ties up access for other technicians who may require access to that switch. Such other technicians must move to another IPX switch location or remain in queue until the first technician releases the IPX switch.

An additional problem is a cumbersome method of accessing the EPX switch. In general, the following steps are necessary to access the IPX switch. The following steps begin with standard call setup, and include commands used for displaying a status of a customer's circuit path, including the customer's frame relay port. In the following example, the customer's circuit traverses an IPX switch having a designation "HLB01", and the customer's circuit is routed on port number 1 of card 21 in the switch.

Initially, the technician must access a "MYRTLE" server (typically a UNIX-based computer) using appropriate access protocols, such as the Internet protocol (IP). The technician cannot gain access directly to an IPX or IGX switch. Instead, access to such IPX/IGX switches must be gained through such a UNIX-based system. The technician typically enters a Telnet address, such as "Telnet 10.xx.xx.xx". Thereafter, the technician must then log into the MYRTLE server with an appropriate user ID and password assigned to the technician. Once the technician logs in, he or she will receive a prompt, such as the prompt "MYRTLE%". Thereafter, the technician must input a Telnet address for a specific intermediate IPX/IGX switch, such as "Telnet 159.xx.x.xxx". The technician must then again log into the IPX switch with an appropriate user ID and password, which is likely different from the previously input user ID and password.

Once logged into the intermediate IPX switch, the technician must enter or type in the desired virtual terminal (VT) command to access the appropriate IPX switch serving the customers' circuit (in this example, HLB01). Thus, the technician types "VT HLB01" to connect to the HLB01IPX switch. Once establishing a connection with the desired switch, the technician may initiate the necessary command for obtaining frame relay port status, such as by entering the command "DSPFRPORT 21.1", where the "21" and "1" refer to the card and port numbers, respectively.

After obtaining circuit status, the technician must properly close the Telnet connection to the IPX switch, otherwise, the switch may become tied up and thereby inaccessible to others. The technician therefore enters a command such as a control character sequence, of "^]", at which point the technician receives the Telnet prompt and enters a "Quit" or "Close" command. Finally, the technician is returned to the MYRTLE% prompt, at which point he or she must exit to properly close the Telnet connection to the MYRTLE server, by typing "Exit".

Unfortunately, the technician must perform all of the above steps for each customer circuit that he or she wishes to analyze. If the technician is to analyze multiple circuits, such a process is cumbersome, repetitive, and time consuming.

SUMMARY OF THE INVENTION

In a broad sense, the present invention embodies a computer-implemented method and a method stored on a computer-readable medium. The methods include the steps of (a) storing, switch access data for a switch in a network; (b) storing at least one command directed to this switch; (c) establishing a communication link with the switch using the switch access data; (d) providing the command to the switch and receiving a response; and (e) outputting the response.

The present invention also embodies an apparatus for use in a telecommunications network having at least one digital switch. The apparatus includes a communication system, an input device, a memory, and a processing unit. The communication system is coupled to the network and permits communication therewith. The processing unit is coupled to the communication system, input device, and memory. The processing unit stores in the memory switch access data and at least one command directed to the switch input via the input device, establishes a communication link with the switch through the communication system using the switch access data, provides the command to the switch through the communication system, receives a response, and outputs the response.

DETAILED DESCRIPTION OF THE INVENTION

A telecommunications network, and in particular, a method and apparatus for analyzing the network, is descried in detail herein. In the following description, numerous specific details are set forth such as screen layouts, ordering and execution of steps, hardware platforms, etc., in order to provide a thorough understanding of the present invention. One skilled in the relevant art, however, will readily recognize that the present invention can be practiced without use of the specific details described herein, or with other specific steps in a routine, different screens and layouts, different hardware, etc. Well-known structures and steps are not shown or described in detail in order to avoid obscuring the present invention.

As explained herein, an exemplary embodiment of the present invention provides a method that automates technician login sequences, and command input, as well as providing automatic logout and timers to prevent technicians from tying up IPX switch access links. Under the exemplary embodiment, access to IPX switches can be more efficiently performed. As a result, errors in the telecommunications network can be rapidly identified using fewer technicians.

Figure 1A:
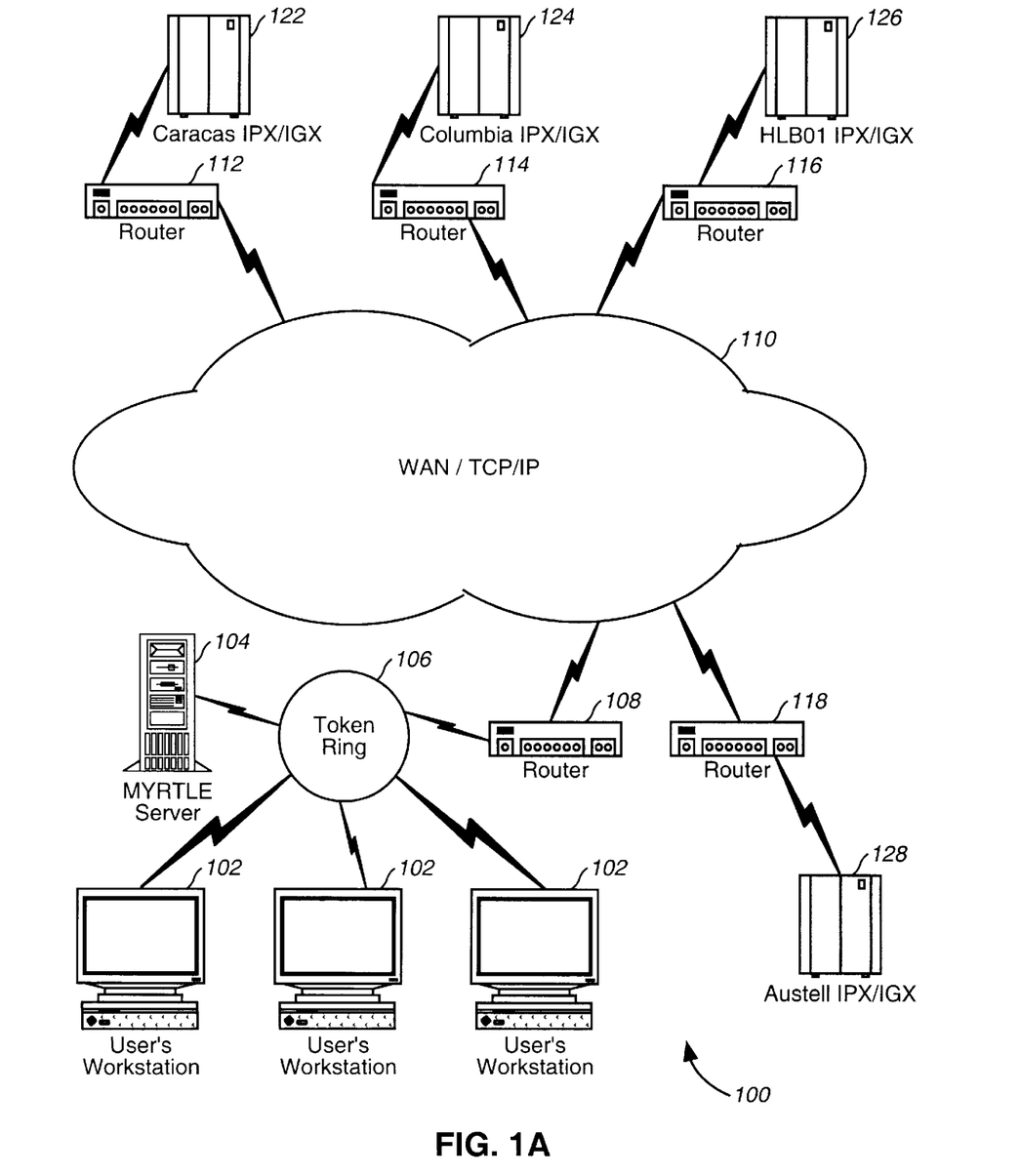
FIG. 1A is a block diagram of a portion of a telecommunications network capable of embodying and employing, an exemplary embodiment of the present invention.

Referring to FIG. 1A, an exemplary portion of a telecommunications network 100 includes multiple user workstations 102. Each of the workstations 102 can communicate with a MYRTLE server 104 via a token ring network 106. The MYRTLE server 104 is a dedicated, UNIX-based computer that coordinates or authorizes access to digital switches within the network 100, such as to IPX or IGX switches. The MYRTLE server 104 is preferably a high performance computer, such as a minicomputer.

A router 108 connects the token ring network 106 to a wide area network such as a transmission control protocol (TCP)/IP network 110. The TCP/IP network 110 can be the Internet. Routers 112, 114, 116 and 118, in turn, couple IPX/IGX switches 122, 124, 126 and 128, respectively, to the TCP/IP network 110. Each of the IPX switches 122–128 can be located at different geographic locations. For example, the IPX/IGX switches 129, 124 and 128 are located at Caracas, Venezuela, Columbia, and Austell, Georgia, respectively. As explained below, the workstations 102 access the IPX/IGX switches 122–128 under an exemplary routine.

Figure 1B:
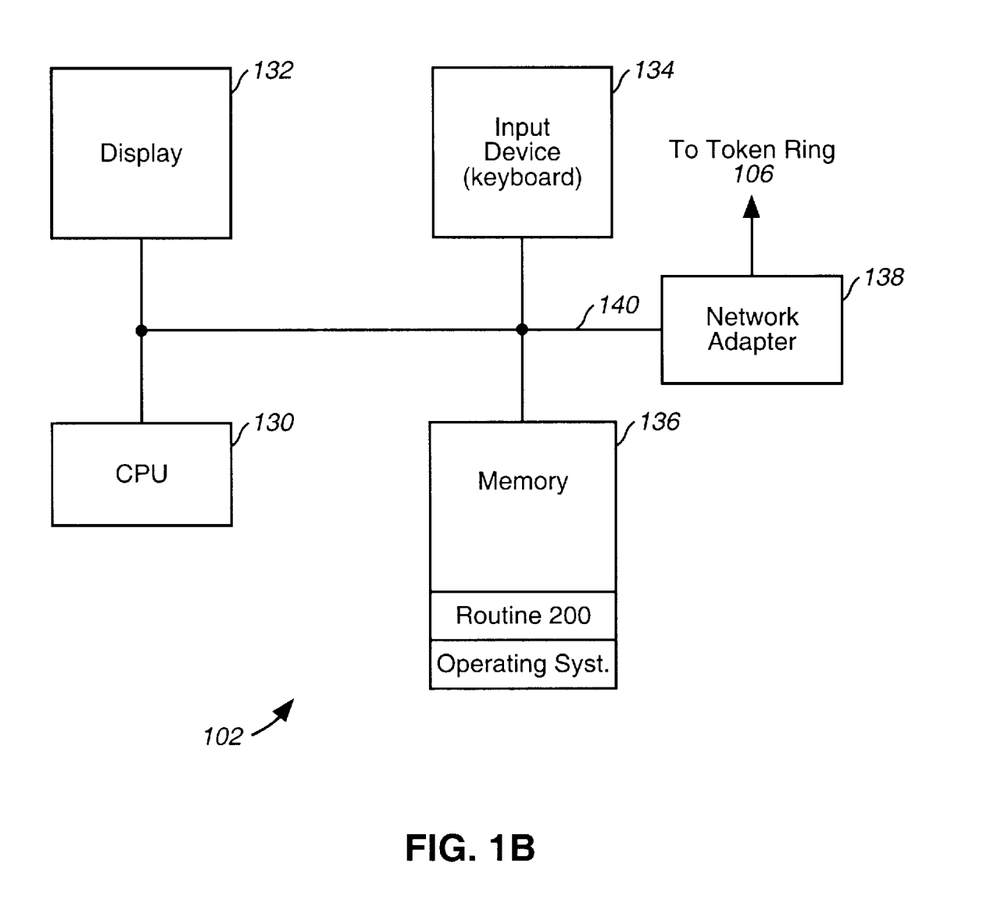
FIG. 1B is a block diagram of a workstation.

As shown in FIG. 1B, each workstation 102 includes a CPU 130, display device 132, input device such as a keyboard 134, memory 136, and network adapter 138, all coupled to a bus 140. The memory 136 includes an operating system, as well as a routine 200 (discussed below). The network adapter 138 couples the workstation 102 to the token ring 106, allowing, communications therebetween.

Figure 2A:
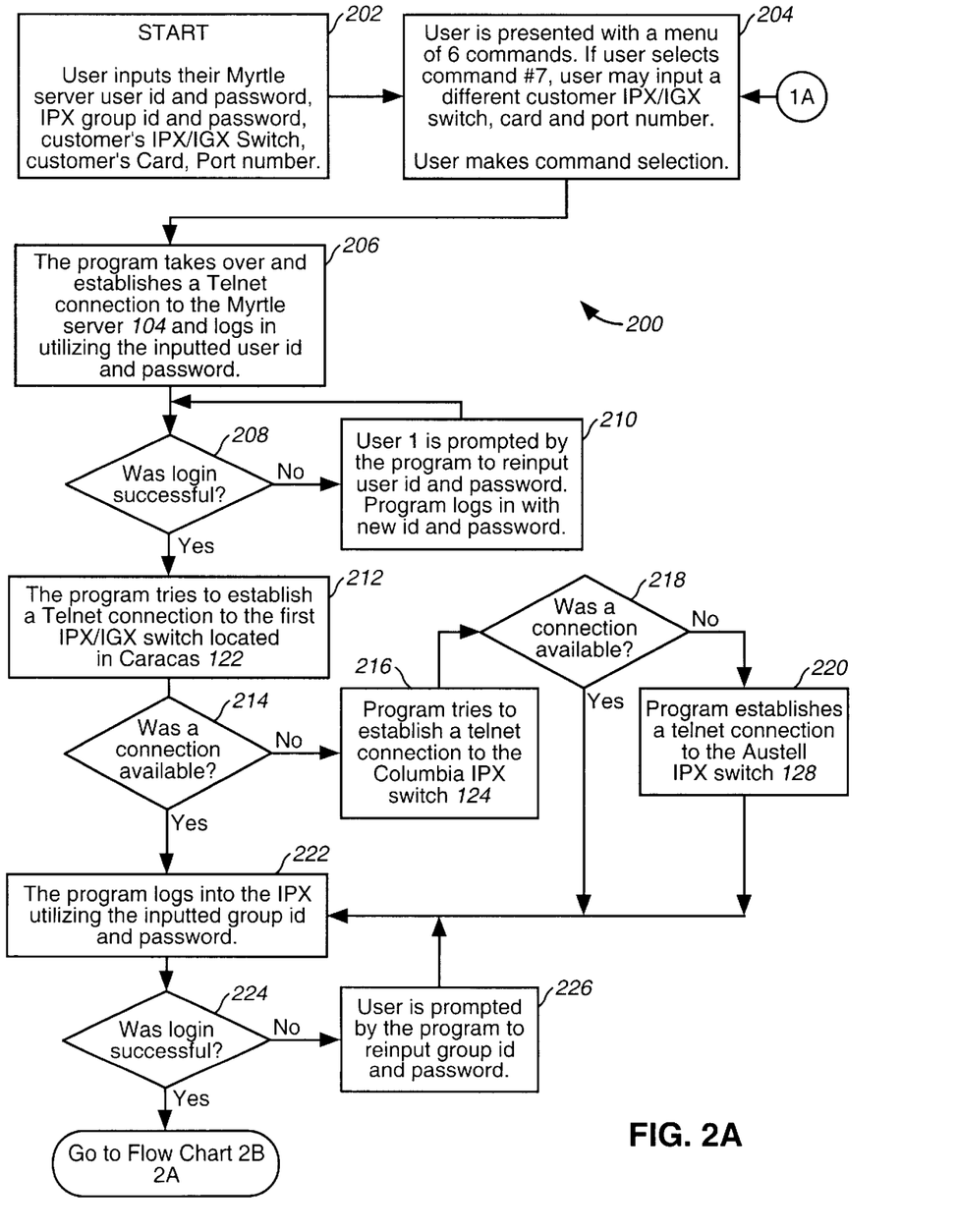
FIGS. 2A and 2B are exemplary flowchart diagrams of a method for accessing telecommunications switches under the exemplary embodiment of the present invention.
Figure 2B:
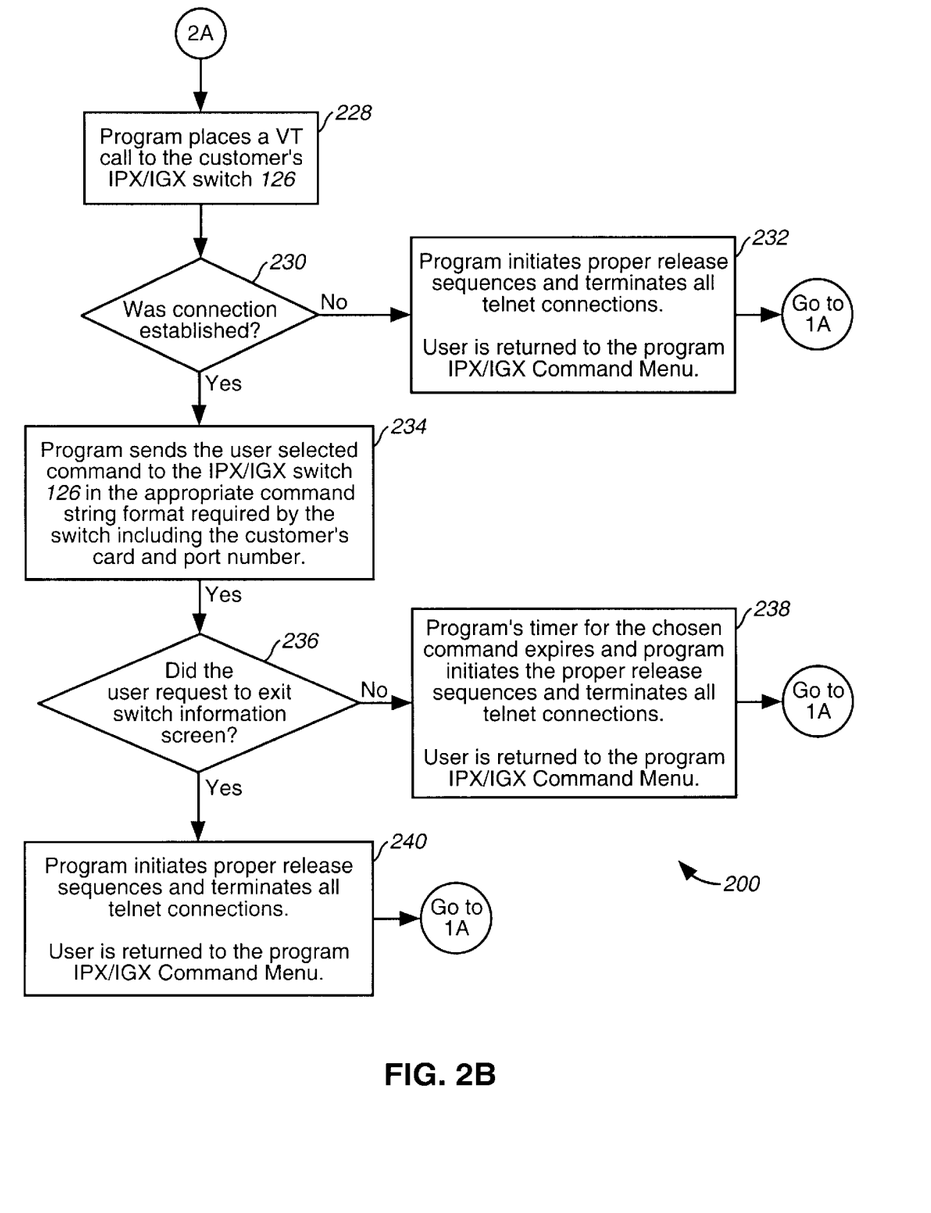

Referring to FIGS. 2A and 2B, a routine 200 performed by the user workstations 102 is shown. Those skilled in the relevant art can create source code from the flowcharts of FIGS. 2A and 2B, together with the detailed description provided herein. For example, source code can be written in Reflection Command Language that runs under Reflections2 for Windows, or written in ProCom Plus.

Figure 3:
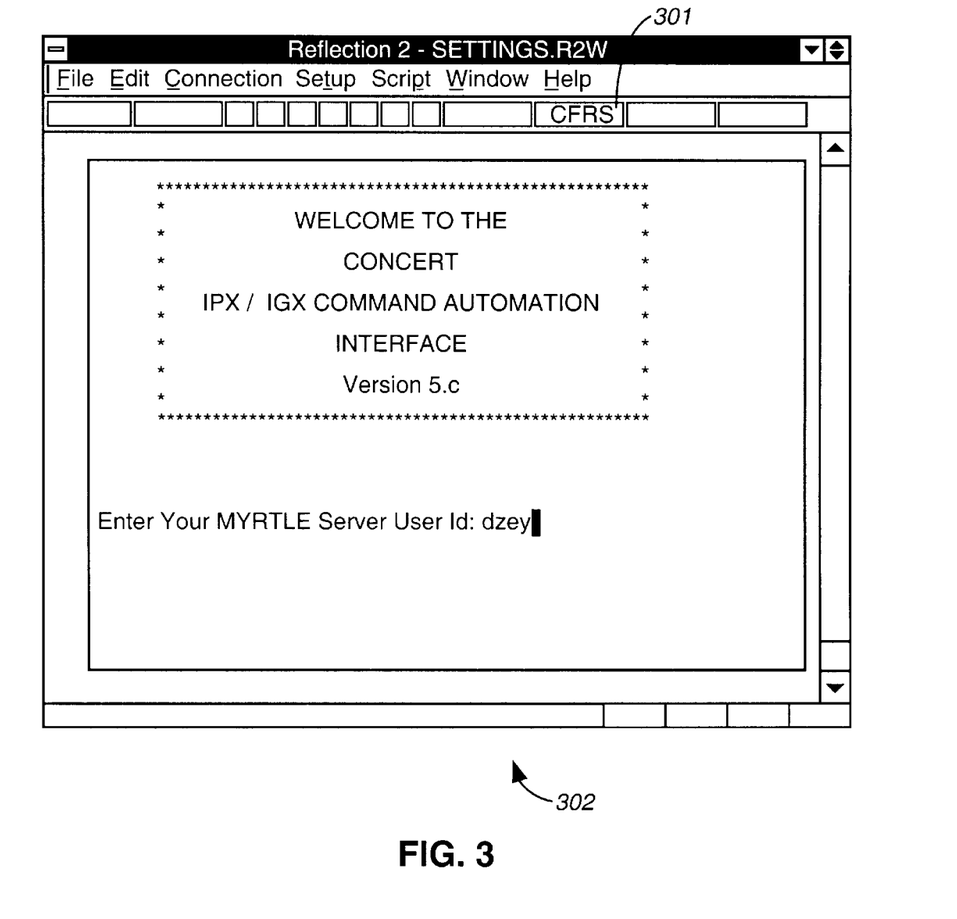
FIG. 3 is a front view of a computer screen showing an exemplary server user ID input screen.

Beginning in step 202, a user or technician inputs his or her user identification code (user ID) and password. Such user IDs and passwords are typically predetermined specifically for the MYRTLE server 104. FIG. 3 shows an exemplary MYRTLE server user ID input screen 302. The technician initially selects a Concert Frame Relay Service (CFRS) button 301 from a toolbar shown on the screen 302. The button 301 is mapped to launch the routine 200. Once launched, the routine 200 initially displays the screen 302 shown in FIG. 3 with a welcoming message such as "WELCOME TO THE CONCERT IPX/IGS COMMAND AUTOMATION INTERFACE". The screen 302 also prompts the technician to input his or her MYRTLE server user ID. As shown in FIG. 3, an exemplary user ID "dzey" has been input by a technician at one of the user workstations 102.

Figure 4:
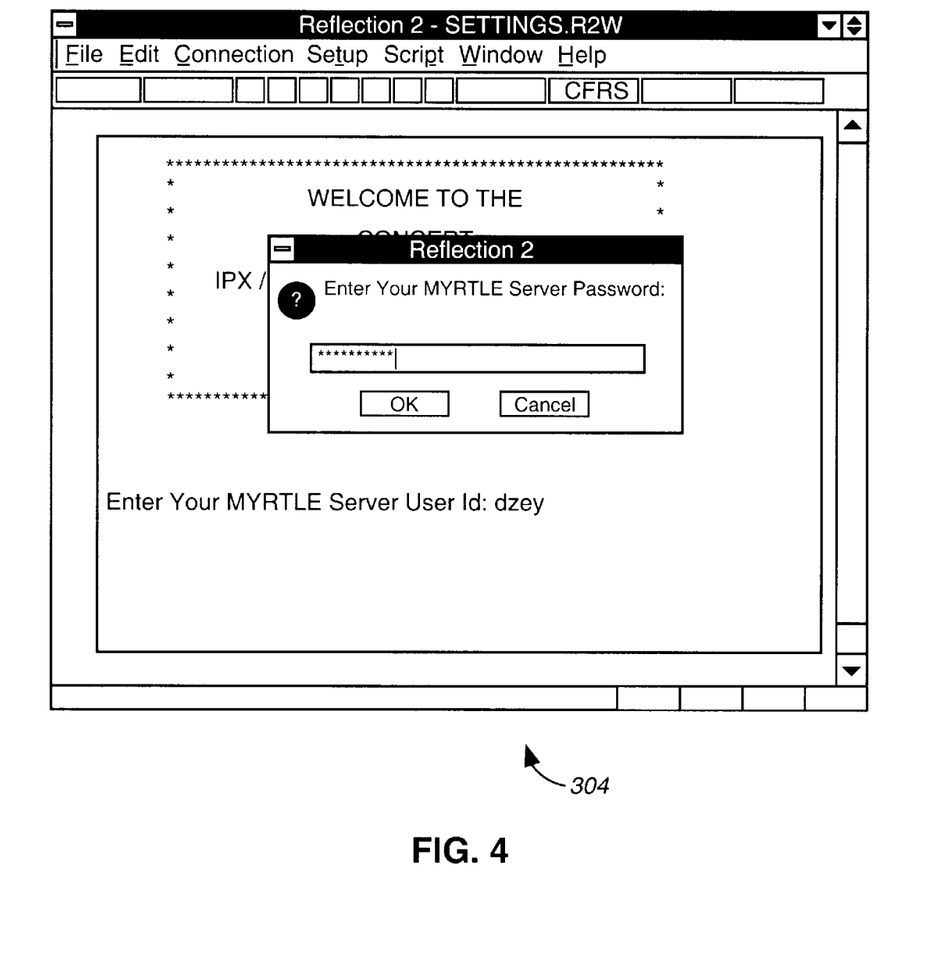
FIG. 4 is a front view of the computer screen showing an exemplary server password entry screen.

After inputting a MYRTLE server user ID and pressing enter, the routine 200 displays, as shown in FIG. 4, an exemplary MYRTLE server password input screen 304. The technician's password is obscured and only "*" are output by the workstation 102. The technician then presses enter to enter the password and move to the next command.

Figure 5:
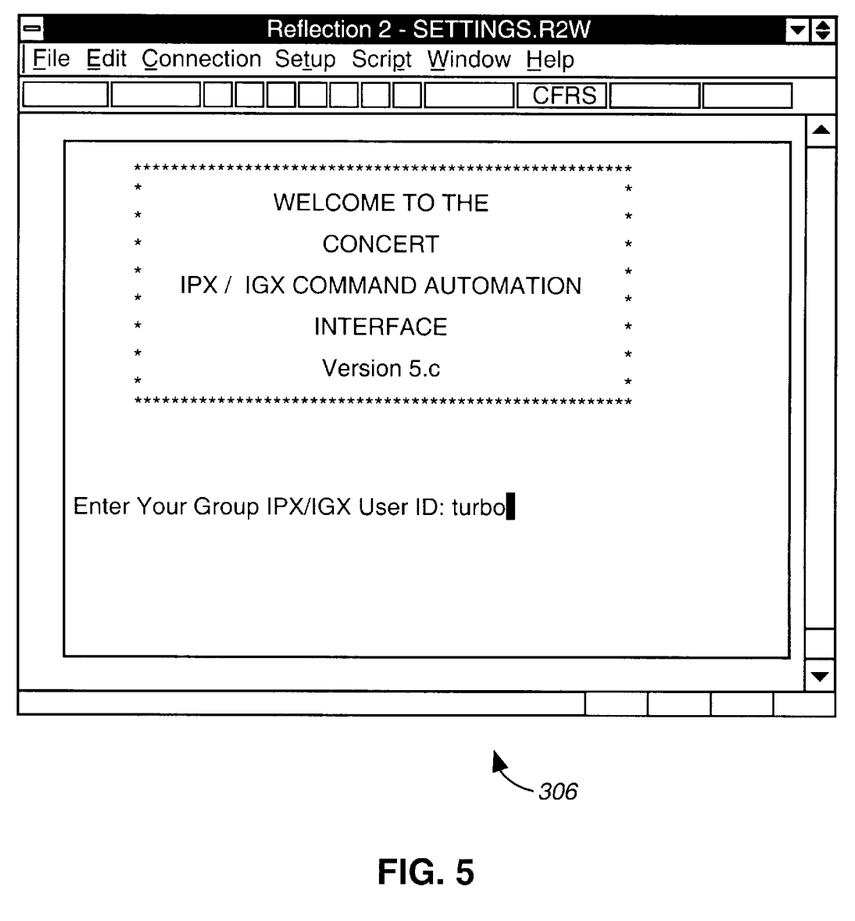
FIG. 5 is a front view of the computer screen showing an exemplary switch user ID entry screen.
Figure 6:
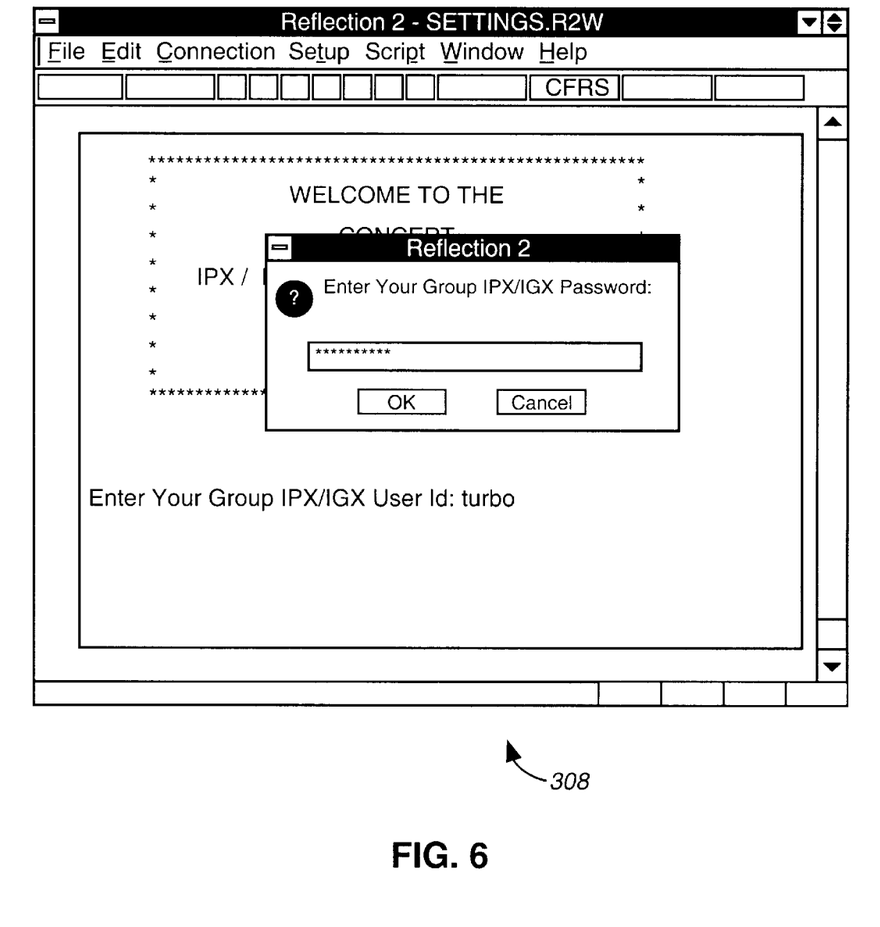
FIG. 6 is a front view of the computer screen showing an exemplary switch password entry screen.

In step 202, the technician also inputs his or her IPX group ID and password. As shown in FIG. 5, an exemplary IPX group user ID input screen 306 is shown. The technician has input an IPX group ID of "turbo". As shown in FIG. 6, an exemplary IPX group password screen 308 is shown. The input screens 306 and 308 are similar to screens 302 and 304.

Figure 7:
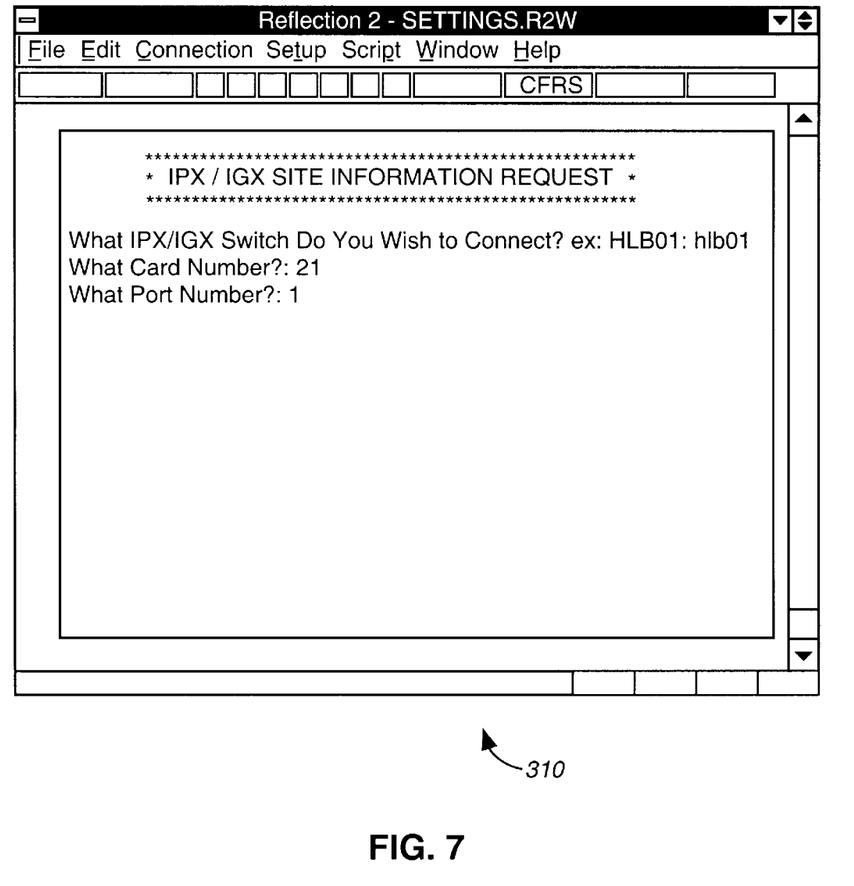
FIG. 7 is a front view of the computer screen showing an exemplary switch, card and port entry screen.

In step 202, the technician furthermore inputs a desired IPX/IGX switch, such as a switch identified as possibly corresponding to a customer's network failure complaint. Additionally, the technician in step 202 inputs card and port numbers associated with the customer's IPX/IGX switch. As shown in FIG. 7, an exemplary IPX/IGX switch, card and port number input screen 310 is shown. Continuing the previously established example, the technician inputs to the screen 310 the IPX/IGX switch "HLB01", as well as card and port numbers 21 and 1, respectively. The workstation 102 stores all data input by the technician under step 202, including the passwords, group IDs, switch ID and card and port number.

Figure 8:
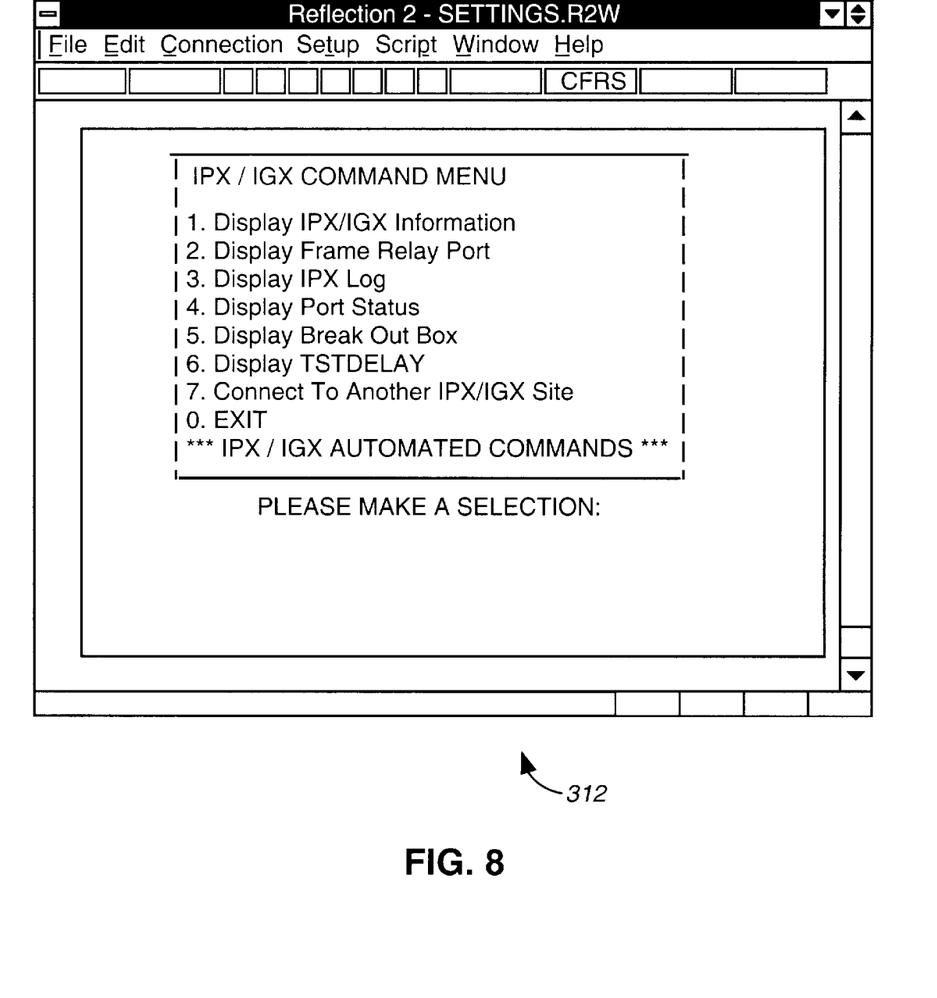
FIG. 8 is a front view of the computer screen showing an exemplary switch command menu screen.

In step 204, the workstation 102 presents a menu of commands to the technician and receives input from the technician based on a selected menu option. Referring to FIG. 8, an exemplary command menu screen 312 is shown. Exemplary commands for querying switches and displaying switch data are presented in Table 1 below.

TABLE 1

| IPX/IGX COMMAND MENU |
| --- |
| 1. Display IPX/IGX Information |
| 2. Display Frame Relay Port |
| 3. Display IPX Log |
| 4. Display Port Status |
| 5. Display Break Out Box |
| 6. Display TSTDELAY |
| 7. Connect To Another IPX/IGX Site |
| 0. EXIT |

The technician can enter multiple commands in screen 312, e.g., "2", "4" and "7" to display Frame Port Relay, Port Status and to then connect to another IPX switch. Following, step 204, the workstation 102 under the routine 200 has received sufficient input data and commands from the technician.

In step 206, the workstation 102 establishes a Telnet connection to the MYRTLE server 104 via the token ring 106 and logs the technician in using the user ID and password previously input in screens 302 and 304. In step 208, the workstation 102 determines whether login was successful. If not, then in step 210, the workstation 102 prompts the user to reinput his or her user ID and password for access to the MYRTLE server 104. The routine 200 loops through steps 208 and 210 until the login is successful. Thereafter, in step 212, the workstation 102 attempts to establish a Telnet connection to a first priority intermediate IPX/IGX switch, such as the switch 122 located in Caracas, Venezuela.

In step 214, the workstation 102 determines whether the Telnet connection was available. If not, then in step 216, the workstation 102 attempts to establish a Telnet connection to a second priority IPX switch, such as the IPX switch 124 in Colombia. In step 218, the workstation 102 determines whether this second attempted connection was available. If not, then in step 220, the workstation 102 establishes a Telnet connection to a lower priority IPX switch, such as the IPX switch 128 in Austell, Ga. The routine 200 attempts to establish connections with IPX switches that typically have less traffic first, before employing switches having greater amounts of traffic. If a connection is determined to be available in step 214 or 218, or after establishing connection with the IPX switch 128, the workstation 102 in step 222 logs the technician into the switch using the group ID and password previously input by the technician in screens 306 and 308.

In step 224, the workstation 102 determines whether login was successful. If not, then in step 226, the routine 200 prompts the technician to reinput his or her group ID and password for accessing the intermediate IPX switch. The routine 200 loops back and continues to perform steps 222, 224, and 226 until login is successful. Thereafter, in step 228 (FIG. 2B), the workstation 102 places a VT call to the specific or target IPX/IGX switch previously input in screen 310 (FIG. 7). Continuing the above example, the workstation 102 places a VT call to switch 126.

In step 230, the workstation 102 determines whether the VT connection is established. If not, then in step 232, the workstation 102 initiates a proper release sequence and terminates all Telnet connections. For example, the workstation 102 provides Quit or Close commands. The workstation 102 also logs out of the MYRTLE server 104. Thereafter, the routine 200 loops back to step 204, where the technician can again input commands to the screen 312 (FIG. 8).

If the connection was established in step 230, then the workstation 102 in step 234 transmits the selected command to the connected switch. Importantly, the workstation 102 transmits the command in the appropriate command string format required by the switch, including the card and port number previously identified in screen 310 (FIG. 7). Continuing the above example, assuming the technician selected option 2 from screen 312 (FIG. 8), the workstation 102 transmits the command "DSPFRPORT 21.1" to the switch 126 to display Frame Relay Port status. In response thereto, the switch 126 provides data to a workstation 102 indicating such status to the technician. The workstation 102 then outputs the status, such as displaying it to the technician.

In step 236, the workstation 102 waits and queries whether the technician has requested to exit the switch, such as inputting commands "7" or "0" to the screen 312 (FIG. 8). If not, and during step 236, a time-out timer counts down. If the timer has expired before the technician has requested to exit the switch, then the routine 200 proceeds to step 238. In the exemplary embodiment, the timer is set to a short duration, such as two minutes. After the timer expires, the workstation 102 in step 238 initiates the proper release sequences and terminates all Telnet connections. The workstation 102, in addition to performing the sequences of step 232 also performs required exit sequences from the current IPX switch. Thereafter, the routine 200 loops back to step 204, at which point the technician can again input additional commands. Similarly, if the technician had requested to exit the current switch under step 236, then in step 240 the workstation 102 initiates proper release sequences and terminates all Telnet connections, and returns the technician to the command menu screen 312 (FIG. 8).

Following steps 232, 238, or 240, the technician can enter a new command in step 204. For example, the technician can enter the command "7" to connect to another IPX/IGX switch. In response thereto, the workstation 102 again displays screen 310, for which the technician can enter a new switch identification and card and port numbers. The routine 200 then proceeds with steps 204–240 as explained above.

If the workstation 102 under the routine 200 experiences an unexpected condition, such as a condition that halts operation of the routine, special commands or "hot keys" permit the technician to perform additional operations, without inputting commands via the screens 302–312. Such hot keys permit the technician to ensure that the routine 200 has stopped, as well as properly releasing Telnet connections and restarting the routine. Table 2 below presents a series of keys on the keyboard 134 (FIG. 1B) and the corresponding command string each key generates. Additionally, the function associated with each key and command string is shown in Table 2 below.

TABLE 2

| Key | Command String | Function |
|---|---|---|
| Esc | RCL Stop Script Command | Properly stops the routine 200 in progress. |
| F1 | N | Required input at certain command prompts. Has no affect to other command prompts. |
| F2 | Key is mapped to the Backspace key | Backspace is an escape sequence required at certain command prompts of IPX/IGX switches. It has no affect to other command prompts. Backspace puts the user back to a "Next Command" prompt. |
| F3 | ^] | Escape sequence required by IPX/IGX switches to release the technician's session and returns the technician to the Telnet prompt. This escape sequence is initiated at the "Next Command" prompt. |
| F4 | close^mlogout^m | Sends the command "Close" followed by a carriage return to properly close the Telnet connection. The "Logout" command is then sent to log the user out of the MYRTLE server 104. |
| F5 | R:\CFRS.RCL | The F5 key is mapped to run the CFRS.RCL routine from the appropriate directory/sub-directory to thereby quickly initiate or restart the routine 200. |

Although specific embodiments of, and examples for, the present invention are described herein for illustrative purposes, various equivalent modifications can be made without departing from the spirit and scope of the invention, as will be recognized by those skilled in the relevant art. The teachings provided herein of embodiments of the present invention can be applied to other switches or communications or network systems, not necessarily the exemplary IPX/IGX switches and telecommunications system described above. Additionally, the workstations 102 can include a UNIX-based operating, system, thereby avoiding the MYRTLE server 104 and the need to establish a connection with the server.

While operations under the present invention have been described as occurring generally in a serial fashion, those skilled in the relevant art will recognize that it is within the scope of the invention to conduct some operations more or less simultaneously, or even in alternate order, from that described herein. These and other changes can be made to the embodiments of the invention in light of the above detailed description. In general, in the following claims, the terms used should not be construed to limit the invention to the specific embodiments disclosed in the specification and the claims, but should be construed to include any network analysis and test system that operates under the claims. Accordingly, the invention is not limited by the disclosure, but instead its scope is to be determined entirely by the following claims.

What is claimed is:

1. In a telecommunication network having at least one digital switch coupled to a server, wherein the server provides authority for access to the switch, a method performed by a computer of a user to automate login sequences to the at least one digital switch, comprising the steps of:

collecting and storing switch and server access data from the user;

collecting and storing at least one command directed to the switch;

establishing a communication link from the computer to the server with the server access data;

establishing a communication link with the switch using the switch access data;

providing the command to the switch and receiving a response; and outputting the response of automated login sequences to the user.

2. The method of claim 1 wherein the switch is an IPX or IGX switch, and wherein the step of collecting and storing switch and server access data includes collecting an identification code and password for the user.

3. The method of claim 1 wherein the steps of collecting include displaying screens to the user via the computer, each screen requesting specific user input, wherein at least one screen requests an identification code of the switch.

4. The method of claim 1, further comprising the step of again performing the steps of collecting and storing at least one command, establishing a communication link from the computer, establishing a communication link with the switch, providing and outputting for another switch in the network.

5. The method of claim 1 wherein the step of establishing a communication link from the computer includes establishing a link with a UNIX-based server, and wherein the step of establishing a communications link with the switch includes first establishing a communications link with an intermediate switch, the intermediate switch being selected from a hierarchical set of switches.

6. The method of claim 1, further comprising the step of disconnecting the communication links with the switch and the server after a predetermined time period.

7. The method of claim 1 wherein the steps are performed in the following order: collecting and storing switch and server access data, collecting and storing at least one command, establishing a communication link from the computer, establishing a communication link with the switch, providing and outputting.

8. In a network having at least one switch, a computer-implemented method to automate login sequences comprising the steps of:

storing switch data;

storing at least one command directed to the switch;

establishing a communication link with the switch using the switch access data;

providing the command to the switch and receiving a response; and outputting the response of automated login sequences to a user.

9. The method of claim 8 wherein the network includes a network computer associated with the switch, and wherein the step of storing switch access data includes storing network computer access data, and wherein the step of establishing includes establishing a communications link with the network computer with the network computer access data.

10. The method of claim 8 wherein the switch is an IPX switch, and wherein the step of storing switch access data includes collecting an identification code and password.

11. The method of claim 8 wherein the step of storing switch access data includes collecting an identification code of the switch.

12. The method of claim 8, further comprising the step of again performing the steps of storing at least one command, establishing, providing and outputting for another switch in the network.

13. The method of claim 8 wherein the step of establishing a communication link with the switch includes first establishing a communications link with an intermediate switch, the intermediate switch being selected from a hierarchical set of switches.

14. The method of claim 8, further comprising the step of disconnecting the communication link with the switch after a predetermined time period.

15. A computer-readable medium containing instructions for a computer in a communications system to automate login sequences, wherein the communication system includes at least one digital switch, the instructions of the computer-readable medium comprising the steps of:

storing switch access data provided by a user;

storing at least one command directed to the switch by the user;

establishing a communication link with the switch using the switch access data;

providing the command to the switch and receiving a response; and outputting the response of automated login sequences to the user.

16. The computer-readable medium of claim 15 wherein the communication system includes a network computer associated with the switch, and wherein the step of storing switch access data includes storing network computer access data, and wherein the step of establishing includes establishing a communications link with the network computer using the network computer access data.

17. The computer-readable medium of claim 15 wherein the switch is an IPX switch, and wherein step of storing switch address data includes collecting an identification code and password for the user.

18. The computer-readable medium of claim 15 wherein the step of storing switch access data includes collecting an identification code of the switch.

19. The computer-readable medium of claim 15, further comprising the step of again performing the steps of storing at least one command, establishing, providing and outputting for another switch in the network.

20. The computer-readable medium of claim 15 wherein the step of establishing a communication link with the switch includes first establishing a communications link with an intermediate switch, the intermediate switch being selected from a hierarchical set of switches.

21. The computer-readable medium of claim 15, further comprising the step of disconnecting the communication link with the switch after a predetermined time period.

22. In a telecommunications network having at least one digital switch, an apparatus to automated login sequences to said at least one digital switch, comprising:
   a communication system coupled to the network and permitting communication therewith;
   at least one input device;
   a memory; and
   a processing unit coupled to the communication system, input device and memory, wherein the processing unit stores in the memory switch access data and at least one command directed to the switch input via the input device, establishes a communication link with the switch through the communication system using the switch access data, provides the command to the switch through the communication system, receives a response, and output the response of automated login sequences to a user.

23. The apparatus of claim 22 wherein the switch is an IPX switch, and wherein the processing unit collects an identification code and password input to the input device.

24. The apparatus of claim 22 wherein the processing unit generates screens, each screen requesting specific user input, wherein at least one screen requests an identification code of the switch.

25. The apparatus of claim 22 wherein the processing unit again stores at least one command, establishes, provides and outputs for another switch in the network.

26. The apparatus of claim 22 wherein the processing unit disconnects the communication link with the switch after a predetermined time period.

27. In a telecommunication network having at least one digital switch coupled to a server, wherein the server provides authority for access to the switch, a method performed by a computer of a user to automate login sequences to the at least one digital switch, comprising the steps of:
   collecting and storing switch and server access data from the user;
   collecting and storing at least one command directed to the switch;
   establishing a communication link from the computer to the server with the server access data;
   establishing a communication link with the switch using the switch access data wherein said link is established by first establishing a communications link with an intermediate switch selected from a plurality of hierarchical set of switches;
   providing the command to the switch and receiving a response; and
   outputting the response of automated login sequences to the user.

28. The method of claim 27 wherein the switch is an IPX or IGX switch, and wherein the step of collect and storing switch and server access data includes collecting an identification code and password for the user.

29. The method of claim 27 wherein the steps of collecting include displaying screens to the user via the computer, each screen requesting specific user input, wherein at least one screen requests an identification code of the switch.

30. The method of claim 27, further comprising the step of again performing the steps of collecting and storing at least one command, establishing a communication link from the computer, establishing a communication link with the switch, providing and outputting for another switch in the network.

31. The method of claim 27 wherein the step of establishing a communication link from the computer includes establishing a link with a UNIX-based server.

32. The method of claim 27, further comprising the step of disconnecting the communication links with the switch and the server after a predetermined time period.

* * * * *